United States Patent [19]
Peppler et al.

[11] 3,785,839
[45] Jan. 15, 1974

[54] PORTLAND CEMENT AND ADDITIVES THEREFOR

[75] Inventors: Richard B. Peppler; Philip A. Rosskopf, both of South Euclid, Ohio

[73] Assignee: Martin Marietta Corporation, New York, N.Y.

[22] Filed: Sept. 9, 1971

[21] Appl. No.: 179,239

[52] U.S. Cl. ................... 106/90, 106/17, 106/315
[51] Int. Cl. ............................................. C04b 7/02
[58] Field of Search .............. 106/90, 314, 315, 106/97, 98, 99

[56] References Cited
UNITED STATES PATENTS
2,152,670   4/1939   Shutt ................................ 106/90
3,030,258   4/1962   Wagner ............................ 106/90

*Primary Examiner*—James E. Poer
*Attorney*—John A. Crowley and Charles N. Shane, Jr.

[57] ABSTRACT

The rate of hardening of a portland cement mix is accelerated by the addition of a monomeric, water-soluble hydroxylated adduct formed by reacting a urea and an aldehyde, said adduct being employed in an amount within the range of from about 0.01 percent to about 1.00 percent, advantageously about 0.2 percent to about 0.8 percent, by weight of cement. The water content of the cement mix for a given consistency tends to be lowered by the incorporation of the adduct, conveniently monomethylolurea and dimethylolurea, while avoiding toxic and corrosive effects normally associated with aldehyde-type set accelerators. The adducts may be employed in concentrated amounts in water and may be used in combination with known set accelerating agents. The adducts may also be employed in combination with set retarders where reduction in water content is desired without appreciable change in the rate of set of the cement mix.

36 Claims, No Drawings

PORTLAND CEMENT AND ADDITIVES THEREFOR

BACKGROUND OF THE INVENTION

1. Field of the Invention

This invention relates to portland cement mixes. More particularly, it relates to the acceleration of the rate of set of said mixes and improved properties of the hardened concrete.

2. Description of the Prior Art

A variety of techniques have been employed to accelerate the hardening of hydraulic cement mixes. These techniques are employed because of circumstances or conditions that render unduly extended the time required for hardening of such mixes in given applications. The rate of hydration of portland cement is very dependent upon temperature, for example, so that concrete containing it will often harden at a slower rate than desired during the winter season unless provisions are taken to accelerate the hardening process. Among the various techniques employed for this purpose are the increasing of the proportion of portland cement in the mix; the use of the most rapid setting type of cement available; the heating of the water and other components of the concrete; and the use of chemical admixtures that act, catalytically or otherwise, to increase the rate at which the concrete hardens.

A number of chemical agents that serve to accelerate the rate of hardening of concrete are known in the art. Calcium chloride in particular is well known as an effective and economic accelerator. In use, however, calcium chloride is known to have certain disadvantages, principally its tendency to promote corrosion of metal embedded in, or in contact with, the calcium chloride-containing concrete. Other agents, such as alkanolamines, urea and calcium formate, do not promote corrosion of metal, but have a less pronounced effect in accelerating the rate of hardening of concrete.

The rate of hardening of concrete containing portland cement is strongly accelerated by the use of low molecular weight aldehydes and polymers thereof, e.g. paraformaldehyde or Paraform. In aqueous solution, however, such materials evolve esthetically objectionable and toxic fumes. As a result, the quantity of these materials that can be incorporated into concrete for set acceleration purposes without imparting such undesirable fumes to the concrete is very limited.

There is a continuing need in the art, therefore, for improved set accelerating agents. In particular, there is a need for new set accelerating agents capable of rapidly accelerating the rate of set of portland cement mixes. In addition, of course, there is a continuing desire in the art for admixtures capable of permitting other advantages, such as reduction of the water content of the mix and improved compressive strength of the hardened concrete.

It is an object of the present invention, therefore, to provide an improved process for accelerating the hardening of portland cement mixes.

It is another object of the invention to provide a technique for accelerating the rate of hardening of hydraulic cement mixes without undesired corrosive or toxic effects.

It is another object of the invention to provide improved chemical admixtures for portland cement mixes.

It is a further object of the invention to provide portland cement mixes having improved properties.

It is a further object of the invention to provide portland cement mixes tending to have reduced water requirements to produce cement mixes of a given consistency.

With these and other objects in mind, the invention is hereinafter set forth in detail, the novel features thereof being pointed out in the appended claims.

SUMMARY OF THE INVENTION

The present invention resides in the incorporation of a monomeric, water-soluble hydroxylated adduct of urea and aldehyde in hydraulic cement mixes comprising portland cement, aggregate and water. The subject adduct, conveniently monomethylolurea or dimethylolurea, can be added in amounts of from about 0.01 percent to about 1.00 percent, preferably from about 0.2 percent to about 0.8 percent, by weight of cement. Hydraulic cement mixes in which the subject adduct is incorporated also tend to require less water content for a given consistency of mix than is required with the more toxic aldehyde admixture.

The invention includes the process for accelerating the rate of set of hydraulic cement mixes and the improved hydraulic cement mix having the subject adduct incorporated therein. In another aspect thereof, the invention includes novel admixture combinations comprising said urea-aldehyde adduct and other set accelerating agents, such as water-soluble formates, and, for applications in which water reduction without set acceleration is desired, said urea-aldehyde adduct and set retarding agents, e.g. calcium lignosulfonate.

DETAILED DESCRIPTION OF THE INVENTION

The present invention permits acceleration of the rate of set of hydraulic cement mixes comprising portland cement, aggregate and sufficient water to effect hydraulic setting of the cement without the corrosive effects associated with the use of calcium chloride and without the evolution of toxic fumes as occurs when conventional aldehyde accelerators are employed. In addition, the acceleration achieved by the adducts of the present invention is accompanied by a limitation on the amount of water required in the cement mix for a given consistency. Thus, the required water content tends to be less than that required for conventional aldehyde accelerators and is frequently less than that required for a given consistency in cement mixes prepared without the addition of such accelerators.

Water reduction is a highly desirable feature in that the compressive strength of the hardened concrete is increased when reduced quantities of water are utilized in hydraulic cement mixes. It has been found that water reducers, i.e. admixtures that lower the mixing requirements of water for a given mix consistency, often also act as set retarders that slow the chemical process of hydration so that the mix remains plastic and workable for a longer period of time. For this reason, set accelerators are often used together with water reducers in order to overcome the retarding tendency of the water reducer. The accelerator thus increases the rate of hydration for early strength development, while the lower water content of the mix results in an increase in the ultimate compressive strength of the hardened concrete. The ability of the adducts of the present invention to accelerate the rate of set of concrete while, at the same time, tending to reduce or limit the water requirements of the mix provides a valuable flexibility in the art of hydraulic cement mix control. As compared with conventional aldehyde admixtures, the adducts of the invention can be used with lower levels of water content without toxic effect or, alternately, in larger dosages at the same water content level, so as to achieve greater compressive strength, greater acceleration of the rate of hardening, or a desired combination of these effects.

The adducts of the present invention comprise the monomeric, water-soluble hydroxylated adducts formed by the reaction of an aldehyde and a urea. While formaldehyde, or paraformaldehyde, is generally preferred, other aldehydes, such as acetaldehyde, may also be employed.

As employed herein, the term "urea" is intended to cover urea and thiourea and their derivatives, such as monoalkyl and monoacyl ureas, urethanes, thiourethanes, guanidines and the like. Examples of such compounds include urea, thiourea, methyl and ethyl urea and thiourea, acetyl urea, guanidine, urethane, etc.

In preferred embodiments of the invention, the adducts employed comprise monomeric dimethylolurea or monomethylolurea, or combinations thereof. As is well known in the art, two mols of formaldehyde may be condensed with one mol of urea under neutral or mildly basic conditions to form dimethylolurea, a white crystalline water-soluble substance. Dimethylolurea is available commercially in approximately 50 percent by weight solids concentration in aqueous mixture. By varying the proportions of reactants, monomethylolurea can similarly be formed.

The adducts of the invention can be employed without corrosive effect on metal embedded in the hardened concrete and without imparting objectionable and toxic fumes to the concrete. When applied to concrete as an aqueous solution, it is not necessary to employ extremely diluted solutions as a safety factor, as is necessary when employing conventional aldehyde accelerators. For example, a saturated solution of paraformaldehyde having only about 22 percent solute by weight of solution would evolve copious, toxic fumes. Very concentrated amounts of the subject adducts, on the other hand, can be employed without objectionable fumes or odor, e.g. concentrated aqueous mixtures having an adduct content of 50 percent or more by weight based on the weight of mixture. The adduct, of course, can also be added in dry powder form or in aqueous mixtures of any desired concentration.

In the practice of the invention, the subject adducts are employed in an amount within the range of from about 0.01 percent to about 1.00 percent, preferably from about 1.2 percent to about 0.8 percent by weight of cement in the overall mix. It is also within the scope of the invention to incorporate other additives for the purpose for which they are normally employed in conventional mixes in the hydraulic cement mixes containing the adducts of the present invention in the amounts indicated for the purpose of accelerating the rate of set of the concrete and, desirably, limiting the amount of water required for a given consistency. Illustrations of the type of additives that may thus be employed are, for example, air-entraining agents, air detraining agents, pozzuolanic materials, fly ash, coloring materials and water repellents. Other well-known additive materials may also be used to accomplish their normal and intended functions.

Among such other additives that may be employed together with the set accelerating adducts of the invention are other known set accelerators. In this embodiment, the combination of accelerators is employed to achieve a rate of hardening that exceeds the acceleration of hardening obtainable by means of the adduct of the invention alone. Water-soluble formates, such as sodium formate, can conveniently be employed for this purpose. In other embodiments, it may be desired to achieve the water reduction obtainable by the adducts of the invention although the acceleration of the rate of hardening is undesired for a particular application. In this event and also within the scope of the invention, the adducts of the invention may be employed together with known set retarders. The combination of additives thus tends to minimize the required water content, but with a less pronounced effect on the rate of hardening than would result from the use of the adducts alone. If desired, the accelerating effect of the subject adduct can be balanced by the retarding effect of the retarder so the rate of hardening of the overall concrete composition remains essentially unchanged. The lignosulfonates, e.g. calcium, sodium and ammonium lignosulfonates, can advantageously be employed as set retarders in this aspect of the invention.

In order to demonstrate the desirable features of the invention, the following examples are set forth, it being understood that the examples are presented for illustrative purposes and are not intended to limit the scope of the invention as set forth in the appended claims.

EXAMPLE 1

In a suitable reaction vessel, 50 grams of paraformaldehyde were dissolved in a liter of water, into which a gram of triethanolamine was also added to assure alkalinity. 100 grams of urea were added, and the mixture was stirred and allowed to stand for four days, although a shorter time would suffice. Upon freeze-drying, monomethylolurea is obtained as a white crystalline material. This adduct and dimethylolurea were used in various comparative tests in which the advantages of the invention were demonstrated with respect to hydraulic cement mixes comprising portland cement, aggregate and sufficient water to effect hydraulic setting of the cement. The same type and brand of cement was used in each mix, and the kind and proportion of coarse and fine aggregate employed were likewise substantially the same. The amount of water added in each instance to effect hydraulic setting was such as to produce concrete mixes of essentially the same consistency. Initial temperature of the concrete and ambient temperature were 50°F. In one set of tests, the use of monomethylolurea was compared with paraformaldehyde and the equivalent plain cement mix, the results being set forth in TABLE I below, the results representing the average values of duplicate tests:

TABLE I

| Mix No. | Additive | Amt. of Additive (% by wt. of Portland cement) | Water Content (gal/cubic yd. of concrete) | Air Vol. % Concr. | Rate of Hardening Index, hr.* |
|---|---|---|---|---|---|
| 1 | None | — | 33.8 | 1.7 | 10% |
| 2 | Paraformaldehyde | 0.07 | 34.0 | 1.5 | 8% |

TABLE I -Continued

| Mix No. | Additive | Amt. of Additive (% by wt. of Portland cement) | Water Content (gal/cubic yd. of concrete) | Air Vol. % Concr. | Rate of Hardening Index, hr.* |
|---|---|---|---|---|---|
| 3 | Monomethylolurea | 0.20 | 34.0 | 1.7 | 8 2/8 |

*In this and in subsequent tables, the time referred to is the time that elapsed from the mixing of the concrete before a 30-pound pull is necessary to remove a steel pin of arbitrary dimension from the body of concrete, the development of the steel-concrete bond being proportional to the degree of hardening or setting of the concrete.

Another set of tests was run in which a different portland cement was used, the mean values obtained in duplicate tests being set forth in TABLE II as follows:

TABLE II

| Mix No. | Additive | Amt. of Additive (% by wt. of Portland cement) | Water Content (gal/cubic yd. of concrete) | Air Vol. % Concr. | Rate of Hardening Index, hr. |
|---|---|---|---|---|---|
| 4 | None | — | 35.0 | 1.7 | 9½ |
| 5 | Paraformaldehyde | 0.07 | 34.8 | 1.6 | 7 |
| 6 | Monomethylolurea | 0.20 | 33.9 | 1.7 | 6½ |

The results set forth in TABLES I and II show that the non-toxic mono-methylolurea adduct has a somewhat greater ability to accelerate the rate of hardening of the cold concrete than does the toxic aldehyde polymer in a dosage that is essentially the aldehyde equivalent of the dosage of the adduct, the proportions of paraformaldehyde and urea that are stoichiometric for monomethylolurea being 1:2 respectively. Both admixtures are shown to provide substantial set acceleration as compared with hydraulic cement mixes containing no accelerator additive. As evidenced by the results of TABLE II, the adduct of the present invention also has a tendency to cause a lesser amount of water to be required than is required with paraformaldehyde, and with the equivalent cement mix prepared without the addition of a set accelerating agent. As indicated above, it is often found necessary to incorporate a set retarding admixture in the mix to achieve such water reduction, with an accelerator being required in addition to overcome the retarding tendency of the water reducer. The subject adduct, on the other hand, advantageously combines its set acceleration properties with a tendency to limit or reduce the water requirements of the mix. This is a highly desirable feature since, as widely known among cement technologists, greater compressive strengths are obtained when reduced quantities of water are utilized.

EXAMPLE 2

By suitably changing the proportions of reactants in the preparation of the adduct, it is possible to obtain dimethylolurea rather than monomethylolurea. In the following experiments, however, comercially available dimethylolurea adduct material having approximately 50 percent by weight adduct in water was employed. The commercial adduct was added in varying amounts to hydraulic cement mixes in comparative tests of cold concrete in the manner previously described with results as set forth in Table III below.

TABLE III

| Mix No. | Additive | Amt. of Additive (% by wt. of cement) | Water Content (gal/cubic yd. of concrete) | Air Vol. % Concr. | Rate of Hardening Index, hr. |
|---|---|---|---|---|---|
| 7 | None | — | 34.4 | 1.8 | 9 |
| 8 | Dimethylolurea Adduct | 0.20 | 33.6 | 2.1 | 7¼ |
| 9 | Dimethylolurea Adduct | 0.40 | 33.7 | 2.5 | 7 |
| 10 | Dimethylolurea Adduct | 0.80 | 33.9 | 3.0 | 6½ |
| 11 | Dimethylolurea Adduct | 1.00 | 33.1 | 3.3 | 7¼ |

The results set forth in this table establish that the incorporation of dimethylolurea in hydraulic cement mixes causes a significant increase or acceleration of the rate of set of the concrete. The accelerating effect was increased as the dosage of adduct employed was increased from 0.2 percent up to 0.8 percent by weight of cement, a further increase in dosage to 1.00 percent resulting in a decrease in the acceleration of set although still providing a significant increase in the setting rate as compared to the untreated cement mix. The dimethylolurea was employed, as indicated above, as an aqueous solution having a solids content of about 50 percent by weight without any objectionable fumes or odor. In addition, the total water content required for a given consistency was lowered by the addition of the dimethylolurea adduct, providing advantages for the hardened cement as well as the desired acceleration of the rate of set.

EXAMPLE 3

In further tests, the monomethylolurea adduct of the invention was employed in concrete together with a known water reducer and set retarder, namely calcium lignosulfonate. Ambient temperature and initial concrete temperature were 70°F. The results, based on the mean values of duplicate tests, were as set forth in TABLE IV below.

TABLE IV

| Mix No. | Additive | Amt. of Additive (% by wt. of cement) | Water Content (gal/cubic yd. of concrete) | Air Vol. % Concr. | Rate of Hardening Index, hr. |
|---|---|---|---|---|---|
| 12 | None | — | 35.5 | 1.7 | 5½ |
| 13 | Monomethylolurea plus Calcium Lignosulfonate | 0.20 + 0.10 | 34.3 | 2.1 | 5½ |

As shown by the results of these tests, the calcium lignosulfonate has a retarding effect that balances the accelerating effect of the subject aldehyde adduct so that the rate of hardening of the mix containing the combination of additives is the same as that of the untreated mix. The water content of the mix containing the additive combination, however, is advantageously reduced as compared with the untreated mix of the same consistency.

EXAMPLE 4

It is known in the art that formaldehyde and polymers thereof may be used in concrete together with set accelerating amounts of water-soluble formates. Such a combination, however, has the disadvantage encountered in the use of the aldehyde component alone, namely evolution of unpleasant and toxic fumes. The use of the subject adducts in such combinations overcome this disadvantage while producing the overall desirable results of greatly accelerating the rate of set and, in addition, significantly reducing the water content of the mix. These effects are illustrated by the results set forth in TABLE V below. The indicated materials were employed as above in concrete at 50°F, the reference plain mix having a greater cement content, namely 5.5 sacks per cubic yard of concrete, than that of the mixes with additives, namely 4.7 sacks of cement per cubic yard of concrete.

TABLE V

| Mix No. | Additive | Amt. of Additive (% by wt. of cement) | Water Content (gal/cubic yd. of concrete) | Air Vol. % Concr. | Rate of Hardening Index, hr. |
|---|---|---|---|---|---|
| 14 | None | — | 35.3 | 1.3 | 8¼ |
| 15 | Dimethylolurea | 0.80 | 33.6 | 2.4 | 6½ |
| 16 | Dimethylolurea plus Sodium Formate | 0.80 + 3.0 | 32.4 | 2.8 | 5¾ |

As shown by the above data, the subject adduct has an appreciable accelerating effect on the cement mix and significantly reduces the desired water content. The further addition of the formate, as in the combination mix no. 16, results in a further acceleration of the rate of hardening and an additional reduction in the water required for a given consistency.

As the subject set accelerators are not only aldehyde adducts but also constitute urea derivatives, further tests were made comparing the effects of urea and the effects of the subject adducts when employed in cold concrete for purposes of increasing the rate of hardening thereof. The same procedures were followed as in the previous examples, the temperature being 50°F. The results are set forth below in TABLE VI.

TABLE VI

| Mix No. | Additive | Amt. of Additive (% by wt. of cement) | Water Content (gal/cubic yd. of concrete) | Air Vol. % Concr. | Rate of Hardening Index, hr. |
|---|---|---|---|---|---|
| 17 | None | — | 35.5 | 1.4 | 9½ |
| 18 | Urea | 0.14 | 35.9 | 1.4 | 9½ |
| 19 | Dimethylolurea | 0.14 | 35.6 | 1.7 | 8¾ |

In this test, the dimethylolurea at a relatively low dosage did not have an appreciable effect on the required water content, increasing said content by 0.1 gal., but did produce a set accelerating effect, as evidenced by the reduction in the hardening index from 9 ½ hrs. to 8 ¾ hrs. At the same dosage and under the same conditions, urea did not have any set accelerating effect at all and resulted in a somewhat greater increase in the water requirements, i.e. a 0.4 gal. increase over the results for a plain mix.

The incorporation of relatively small amounts of monomeric, water-soluble, hydroxylated adducts formed by the reaction of an aldehyde and a urea, conveniently monomethylolurea and dimethylolurea, results in an advantageous increase in the rate of hardening of hydraulic cement mixes. The use of such adducts is free of corrosive effects and of the undesired evolution of toxic fumes that accompany the use of formaldehyde and polymers thereof in the absence of precautionary dilution. The hydraulic cement mixes having the subject adducts therein also tend to have a limited water content requirement for a given consistency, providing further desirable benefits with regard to the hardened concrete. Because of the ability of the subject adducts to operate effectively in combination with known set retarders and set accelerating agents to provide a desired combination of beneficial effects, a further advantageous embodiment of the invention resides in admixture combinations of the subject adducts and such known set retarding and set accelerating agents. In such admixture or additive compositions, the relative amounts of the subject adducts and of the conventional agents may, as will be appreciated in the art, subject to wide variation depending upon the particular additive or balancing effects desired in any given applications. It will be recognized that such additive compositions can be added in dry powder form or in liquid mixtures of any desired concentration. The specific examples provide illustrative instances in which additive combinations are used to achieve as much acceleration as possible or, alternately, to balance acceleration and retarding effects while achieving an important reduction in the water content required for a given consistency of mix. The present invention in all of its embodiments, therefore, represents a significant and commercially useful advance in the art of controlling the hardening of cement. As such, the invention provides a valuable flexibility to facilitate the control of cement for particular applications and operating conditions.

Therefore, I claim:

1. A hydraulic cement mix comprising portland cement, aggregate, sufficient water to effect hydraulic setting of the cement, and an additive comprising a monomeric, water-soluble, hydroxylated adduct formed by the reaction of an aldehyde and a urea, said additive being present in an amount within the range of from about 0.01 percent to about 0.8 percent by weight of cement, whereby the rate of hardening of said cement mix is accelerated and the amount of water required for a given consistency is limited without undesired toxic or corrosive effects.

2. The hydraulic cement mix of claim 1 in which the additive comprises monomethylolurea.

3. The hydraulic cement mix of claim 2 in which said additive is present in an amount within the range of from about 0.2 percent to about 0.8 percent by weight of cement.

4. The hydraulic cement mix of claim 1 in which said additive comprises dimethylolurea.

5. The hydraulic cement mix of claim 4 in which said additive is present in an amount within the range of from about 0.2 percent to about 0.8 percent by weight of cement.

6. The hydraulic cement mix of claim 1 and including therein a second additive comprising a concrete set retarding agent in an amount such that the effect of said combination of additives on the rate of hardening is less than that resulting from the use of the first additive alone, the water content of the mix for a given consistency being advantageously limited.

7. The hydraulic cement mix of claim 6 in which said set retarder comprises calcium lignosulfonate and said first additive is taken from the group consisting of monomethylolurea, dimethylolurea and mixtures thereof.

8. The hydraulic cement mix of claim 7 in which said first additive is present in an amount within the range of from about 0.2 percent to about 0.8 percent by weight of cement.

9. The hydraulic cement mix of claim 1 and including a second additive comprising an additional set accelerating agent in an amount such as to effect a further acceleration in the rate of hardening of said cement mix.

10. The hydraulic cement mix of claim 9 in which said second additive comprises water-soluble formates.

11. The hydraulic cement mix of claim 10 in which said water-soluble formates comprise sodium formate.

12. The hydraulic cement mix of claim 10 in which said first additive is taken from the group consisting of monomethylolurea, dimethylolurea, and mixtures thereof.

13. The hydraulic cement mix of claim 12 in which said first additive is present in an amount within the range of from about 0.2 percent to about 0.8 percent by weight of cement.

14. A process for accelerating the hardening of hydraulic cement mixes comprising incorporating an additive in a hydraulic cement mix of portland cement, aggregate, and sufficient water to effect hydraulic setting of the cement, said additive comprising a monomeric, water-soluble hydroxylated adduct formed by the reaction of an aldehyde and a urea, said additive being incorporated in an amount within the range of from about 0.01 percent to about 0.8 percent by weight of cement, whereby the rate of hardening of the cement mix is accelerated and the amount of water required for a given consistency is limited without undesired toxic or corrosive effects.

15. The process of claim 14 in which said additive is incorporated in said mix as a dry powder.

16. The process of claim 4 in which said additive is incorporated in said mix as a water mixture.

17. The process of claim 16 in which said additive is incorporated as a concentrated water mixture having an adduct concentration of at least about 50 percent by weight of said mixture.

18. The process of claim 14 in which the additive comprises monomethylolurea.

19. The process of claim 18 in which said additive is incorporated in an amount within the range of from about 0.2 percent to about 0.8 percent by weight of cement.

20. The process of claim 14 in which the additive comprises dimethylolurea.

21. The process of claim 20 in which said additive is incorporated in an amount within the range of from about 0.2 percent to about 0.8 percent by weight of cement.

22. The process of claim 14 and including the incorporating of a second additive in said cement mix, said second additive comprising a concrete set retarder in an amount such that the effect of said combination of additives on the rate of hardening is less than that resulting from the use of the first additive alone, the water content of the mix for a given consistency being advantageously limited.

23. The process of claim 22 in which said set retarder comprises calcium lignosulfonate and said first additive is taken from the group consisting of monomethylolurea, dimethylolurea and mixtures thereof.

24. The process of claim 23 in which said first additive is incorporated into the cement mix in an amount within the range of from about 0.2 percent to about 0.8 percent by weight of cement.

25. The process of claim 14 and including the incorporating of a second additive in said cement mix, said second additive comprising an additional set accelerating agent in an amount such as to effect a further acceleration in the rate of hardening of said cement mix.

26. The process of claim 25 in which said second additive comprises water-soluble formates.

27. The process of claim 26 in which said water-soluble formates comprise sodium formate.

28. The process of claim 26 in which said first additive is taken from the group consisting of monomethylolurea, dimethylolurea, and mixtures thereof.

29. The process of claim 28 in which said first additive is incorporated in an amount within the range of from about 0.2 percent to about 0.8 percent by weight of cement.

30. The process of claim 29 in which said first additive comprises di-methylolurea.

31. The process of claim 22 in which said first additive is incorporated in said mix in dry powder form.

32. The process of claim 22 in which said first additive is incorporated in said mix as a water mixture.

33. The process of claim 32 in which said first additive is incorporated as a concentrated water mixture having an adduct concentration of at least about 50 percent by weight of said mixture.

34. The process of claim 25 in which said first additive is incorporated in said mix in dry powder form.

35. The process of claim 25 in which said first additive is incorporated in said mix as a water mixture.

36. The process of claim 35 in which said first additive is incorporated as a concentrated water mixture having an adduct concentration of at least about 50 percent by weight of said mixture.

* * * * *

UNITED STATES PATENT OFFICE
CERTIFICATE OF CORRECTION

Patent No. 3,785,839               Dated January 15, 1974

Inventor(s) Richard B. Peppler, et al

It is certified that error appears in the above-identified patent and that said Letters Patent are hereby corrected as shown below:

In Column 3, line 56, change "1.2 percent" to -- 0.2 percent --.

In Columns 4 and 5 - Table I; Column 5, Table II; Column 6, Table III and Table IV; Column 7, Tables V and VI - last column in heading of each:
         change "hr." to -- hrs. --.

In Column 6, Table IV, under third column of table, re Mix No. 13:
         change "0.20 + 0.10" to -- 0.20 +
                                                 0.10 --.

Signed and sealed this 14th day of May 1974.

(SEAL)
Attest:

EDWARD M. FLETCHER, JR.               C. MARSHALL DANN
Attesting Officer                         Commissioner of Patents